United States Patent [19]

Wagner

[11] Patent Number: 5,775,173

[45] Date of Patent: Jul. 7, 1998

[54] ACTUATING DEVICE FOR A CABLE LINE

[76] Inventor: Rudolf Wagner, Lerschstrasse 7, A-4600 Wels, Austria

[21] Appl. No.: 680,630

[22] Filed: Jul. 16, 1996

[30] Foreign Application Priority Data

Jul. 17, 1995 [AT] Austria .................. 1209/95

[51] Int. Cl.$^6$ ............................. B62L 3/02
[52] U.S. Cl. ................... 74/502.2; 74/489; 74/516
[58] Field of Search ................... 74/502.2, 488, 74/489, 519, 516

[56] References Cited

U.S. PATENT DOCUMENTS

| 5,279,179 | 1/1994 | Yoshigai | 74/502.2 |
| 5,528,954 | 6/1996 | Yoshigai | 74/502.2 X |

FOREIGN PATENT DOCUMENTS

| 0 389 931 | 10/1990 | European Pat. Off. . |
| 0 435 248 | 7/1991 | European Pat. Off. . |
| 0 593 842 | 4/1994 | European Pat. Off. . |
| 0 635 422 | 1/1995 | European Pat. Off. . |
| 0 639 495 | 2/1995 | European Pat. Off. . |
| 895963 | 2/1945 | France . |

*Primary Examiner*—Charles A. Marmor
*Assistant Examiner*—Saúl J. Rodríguez
*Attorney, Agent, or Firm*—Collard & Roe, P.C.

[57] ABSTRACT

An actuating device for a cable line, particularly a cable line of a bicycle or motorcycle brake, comprise a fixed support including an extension defining a guide for a traction cable of the cable line, and a handle. The handle includes an actuating lever pivotally linked to the fixed support for pivoting about a pivot axis extending transversely to the guide, the traction cable being connected to the actuating lever, a hand grip arranged to pivot the actuating lever, a handle lever pivotally linked to the fixed support for pivoting about a pivot axis extending parallel to the pivot axis of the actuating lever, the hand grip being arranged on the handle lever, and the handle lever and the actuating lever constituting cooperating members of a gearing.

1 Claim, 2 Drawing Sheets

ACTUATING DEVICE FOR A CABLE LINE

BACKGROUND OF THE INVENTION

1. Field of the Invention

The present invention relates to an actuating device for a cable line, particularly a cable line of a bicycle or motorcycle brake, which comprises a fixed support including an extension defining a guide for a traction cable of the cable line, and a handle including an actuating lever pivotally linked to the fixed support for pivoting about a pivot axis extending transversely to the guide, the traction cable being connected to the actuating lever.

2. Description of the Prior Art

In conventional actuating devices of this type, the actuating levers have an arm directed towards an extension defining a guide for the traction cable and an abutment for the traction cable as well as an arm extending in the opposite direction and constituting a hand grip whereby pivoting of the hand grip causes a relative movement of the abutment with respect to the guide so that the traction cable is longitudinally adjustable in accordance with the pivoting pat of the hand grip. On the basis of the geometry of the device and the selected lever arms, the pivoting path of the hand grip is converted into a corresponding stroke and the manually exerted actuating force is converted into a corresponding traction force while the transmission ratio remains constant over the entire actuating range. However, in conventional brakes, there is an idle path at the beginning of applying the brake until the brake jaws contact the brake faces and before the brake jaws are presses with rising force against the brake faces. Thus, actuating of the brake involves a long path with little force and a small force with considerable force as the hand grip is pivoted, which operating condition is not taken into account in conventional actuating devices. This causes compromises which are particularly unsatisfactory in extreme cases. Because of the prevailing limited pivoting range of the hand grip and the constant transmission ratio, a substantial portion of the pivoting path is associated with the idle actuating path, and the application of the actual braking force then requires high actuating forces within a short path. This makes sensitive braking very difficult, and braking over a longer time rapidly leads to tiring, thus endangering the driving.

French patent No. 895,963 discloses an actuating device for a cable line wherein the traction cable is fixedly anchored in a fixed support and the cable sleeve is attached to a pivotal actuating lever. A separate handle lever is pivotally mounted on the fixed support for pivoting about an axis extending parallel to the pivot axis of the actuating lever and engages a pressure member of the actuating lever with a curved pressure side so that, upon pivoting of the handle lever, its pressure side will cause the pressure member to pivot the actuating lever so that the cable sleeve will be adjusted relative to the traction cable. This arrangement produces a cam gear between handle lever and actuating lever with a force-path-transmission but it permits only small transmission ratios. Furthermore, the force transmission changes from initially large to continuously smaller transmission ratios and correspondingly the path transmissions change from initially small to continuously larger transmission ratios, which is contrary to the desired conditions for actuating a brake. Also, in the actuation of brakes, the displacement of the cable sleeve is less useful than that of the traction cable.

SUMMARY OF THE INVENTION

It is the primary object of this invention to overcome these disadvantages of known actuating devices for bicycle or motorcycle brakes by so improving an actuating device of the first-described type that it meets the actual requirements of the cable line operation and produces an effect adapted to the prevailing operating forces while keeping the structure relatively simple.

The above and other objects are accomplished according to the invention with an actuating device for a cable line, particularly a cable line of a bicycle or motorcycle brake, which comprises a fixed support including an extension defining a guide for a traction cable of the cable line, and a handle including an actuating lever pivotally linked to the fixed support for pivoting about a pivot axis extending transversely to the guide, the traction cable being connected to the actuating lever, a hand grip arranged to pivot the actuating lever, a handle lever pivotally linked to the fixed support for pivoting about a pivot axis extending parallel to the pivot axis of the actuating lever, the hand grip being arranged on the handle lever, and the handle lever and the actuating lever constituting cooperating members of a gearing.

By the simple means of providing a hand grip as a handle lever separate from the actuating lever and thus to have two lever parts which are movable relative to each other, the two levers can cooperate by a gearing transmission, which makes it possible to influence the movement and transmission conditions in any desired manner. The transmission ratios need not remain constant and may be changed according to prevailing requirements so that preferably larger pivoting paths with smaller forces are used initially and then, when actual braking occurs, small paths are used with larger applied force. In this way, the idle paths involving little force are passed quickly and the forceful braking can proceed slowly and with stronger force. The available pivoting range of the hand grip on the handle lever can be used to best advantage in such an arrangement and can be optimized with respect to the pivoting path-force ratios.

Various structural arrangements may be used so that the handle lever and the actuating lever constitute cooperating members of a gearing. According to one preferred embodiment, for example, the actuating lever comprises a curved cam track and the handle lever carries a cam in frictional engagement with the curved cam track to form a cam gear. When the handle lever is pivoted, the cam glides along the cam track so that the lengths of the levers correspondingly change during the force transmission from the hand grip to the traction cable. Desired changes in the traction path and the traction force transmission may be obtained by the shape of the curved cam track and the pivoting path of the cam. The shape of the curved cam track will also predetermine the extent of the transmission ratio changes and, for example, a break in the curved cam track may sensibly indicate the transition of the idle path to the force-transmission path to the driver. Since the actuating lever may be exchanged without difficulty, any actuating device may be provided with actuating levers with different curved cam tracks so that is may be adapted to prevailing operating conditions.

According to another preferred embodiment, the actuating device further comprises a connecting plate pivotally linking the actuating lever and the handle lever whereby the gearing is constituted by a quadrilateral bellcrank control. The connecting plate operatively connects the two levers.

If the handle lever is a two-armed lever, an arm of the two-armed lever remote from the actuating lever constituting the hand grip and the arm of the two-armed lever adjacent the actuating lever carrying the cam, the two levers may be functionally coordinated in a small space and will be geared together without encountering bearing or movement difficulties.

BRIEF DESCRIPTION OF THE DRAWING

The above and other objects, advantages and features of the present invention will become more apparent from the following detailed description of certain now preferred embodiments, taken in conjunction with the accompanying drawing wherein.

DETAILED DESCRIPTION OF PREFERRED EMBODIMENTS

Figure 1:
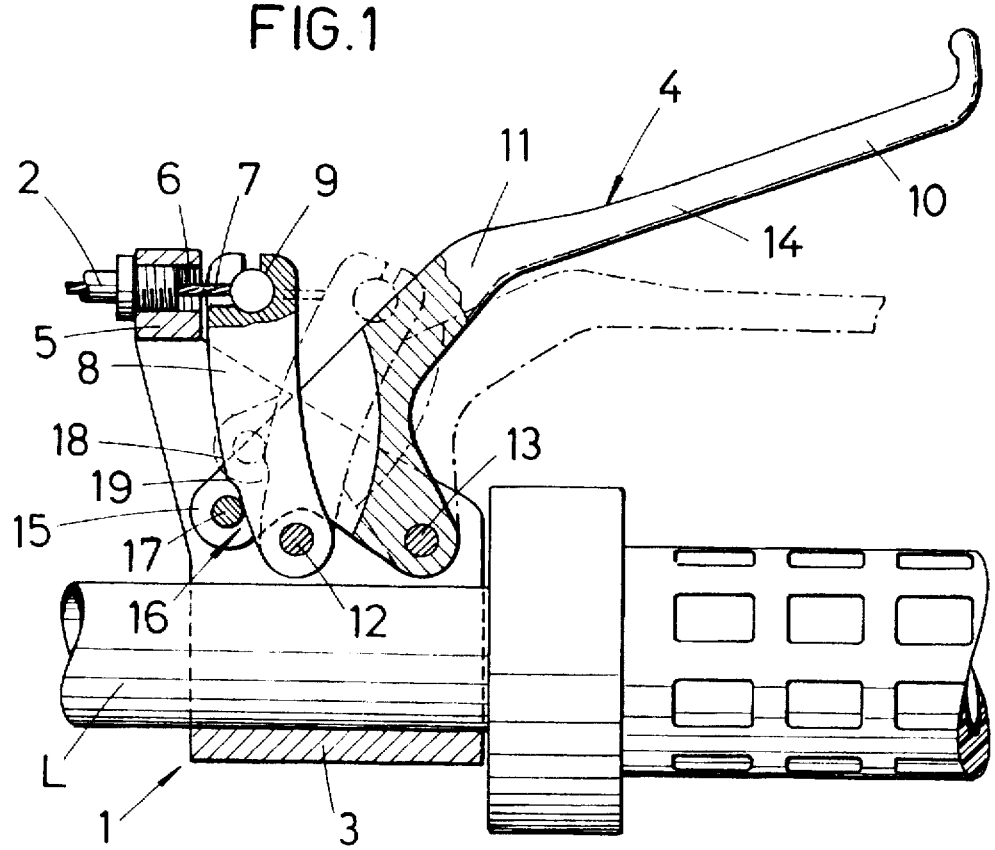
FIG. 1 shows a side elevation, partly in section, of one embodiment of an actuation device according to this invention.
Figure 2:
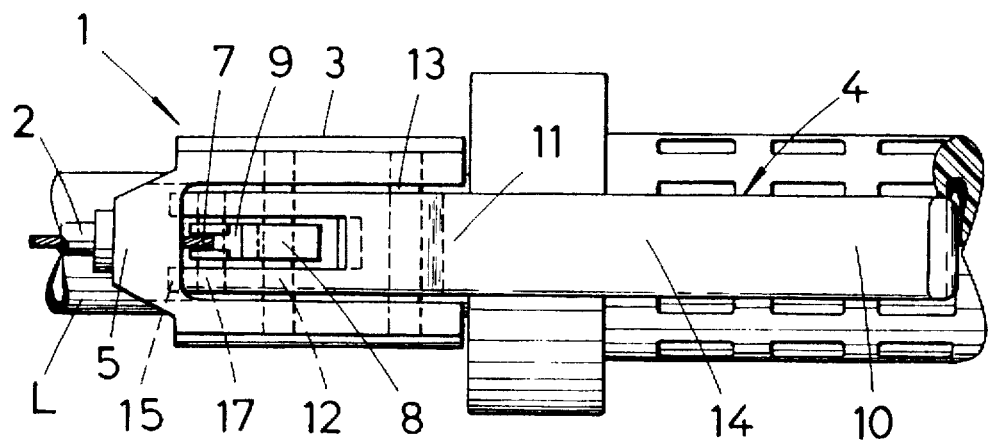
FIG. 2 is a top view of the actuation device of FIG. 1.

Referring first to FIGS. 1 and 2, there is shown actuating device 1 for cable line 2, particularly a cable line of a bicycle or motorcycle brake, which has not been illustrated. The actuating device comprises fixed support 3 including extension 5 defining guide 6 for traction cable 7 of the cable line. Fixed support 3 is mounted on steering bar L of a bicycle. Actuating device 1 further comprises handle 4 which is movable relative to fixed support 3. The handle includes actuating lever 8 pivotally linked to the fixed support for pivoting about pivot axis 12 extending transversely to guide 6, and traction cable 7 is connected to abutment 9 of the actuating lever. Hand grip 10 is arranged to pivot actuating lever 8, and handle lever 11 is pivotally linked to fixed support 3 for pivoting about pivot axis 13 extending parallel to pivot axis 12 of actuating lever 8, hand grip 10 being arranged on handle lever 11. The handle lever and the actuating lever constitute cooperating members of a gearing.

As shown in FIG. 1, actuating lever 8 comprises curved cam track 18 and handle lever 11 carriers cam 17 in frictional engagement with the curved cam track to form cam gear 16. When hand grip 10 is pivoted from the rest position (shown in full lines) into the braking position (shown in phantom lines), cam 17 glides along curved cam track 18 radially outwardly and, depending on the shape of the curved cam track, a predetermined change in the transmission ratios between handle lever movement and traction cable movement is obtainable. As shown, break 19 may be provide along curved cam track 18, a long pivoting stroke being effected without great application of force to pass through the idle path of the brake, whereupon stronger hand pressure is applied over a shorter traction path of cable 7 to effectuate braking, with an optimized lever actuation.

As shown, handle lever 11 is a two-armed lever, arm 14 of the two-armed lever remote from actuating lever 8 constituting hand grip 10 and arm 15 of the two-armed adjacent the actuation lever carrying cam 17.

Figure 3:
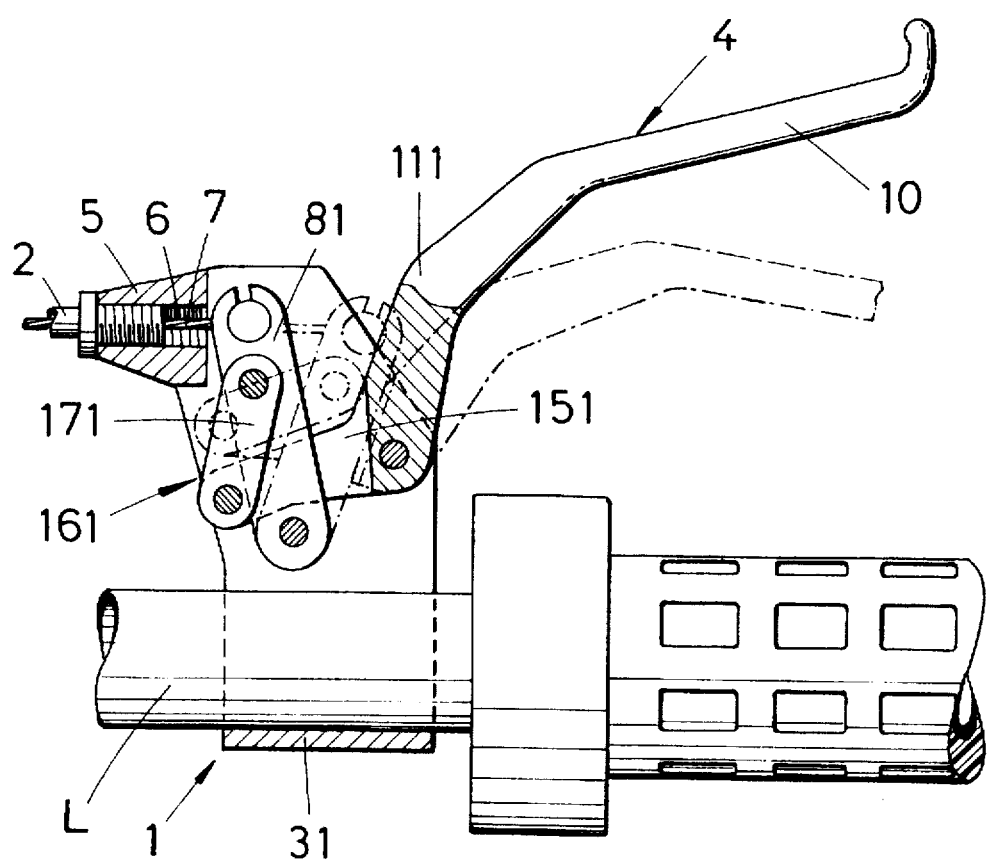
FIG. 3 is a view like that of FIG. 1, showing another embodiment.

In the embodiment of FIG. 3, wherein like reference numerals indicate like parts functioning in a like manner, actuating device 1 further comprises connecting plate 171 pivotally linking actuating lever 81 and handle lever 111 whereby the gearing between the levers is constituted by quadrilateral bellcrank control 161. Connecting plates 171 links handle lever arm 151 to actuating lever 81. In this case, too, pivoting of handle lever 111 causes changing force and path transmission ratios in dependence on the pivoting position of handle lever 111 and actuating lever 81, thus again optimizing the transmission ratios.

What is claimed is:

1. An actuating device for a cable line, which comprises:

(a) a fixed support including (1) an extension defining a guide for a traction cable of the cable line, and (b) a handle including (1) an actuating lever pivotally linked to the fixed support for pivoting about a pivot axis extending transversely to the guide, the traction cable being connected to the actuating lever, and the actuating lever comprising a curved cam track, (2) a hand grip arranged to pivot the actuating lever, (3) a two-armed handle lever pivotally linked to the fixed support for pivoting about a pivot axis extending parallel to the pivot axis of the actuating lever, an arm of the two-armed handle lever remote from the actuating lever constituting the hand grip, and (4) the arm of the two-armed handle lever adjacent the actuating lever carrying a cam follower in frictional engagement with the curved cam track to form a cam gear, whereby the handle lever and the actuating lever constitute cooperating members of a gearing.

* * * * *